United States Patent
Travez et al.

(10) Patent No.: US 8,136,432 B2
(45) Date of Patent: Mar. 20, 2012

(54) CLOSED-LOOP CNC MACHINE SYSTEM AND METHOD

(75) Inventors: Joe V. Travez, Falls Church, VA (US); John Binette, Alexandria, VA (US); Jose M. Travez, North Potomac, MD (US); Ben Feldman, Reston, VA (US); Don McLaughlin, Ashburn, VA (US); Italo D. Travez, Arlington, VA (US)

(73) Assignee: Prototype Productions, Inc., Ashburn, VA (US)

( * ) Notice: Subject to any disclaimer, the term of this patent is extended or adjusted under 35 U.S.C. 154(b) by 0 days.

(21) Appl. No.: 13/051,362

(22) Filed: Mar. 18, 2011

(65) Prior Publication Data

US 2011/0264257 A1    Oct. 27, 2011

Related U.S. Application Data

(63) Continuation of application No. 11/450,444, filed on Jun. 12, 2006, now Pat. No. 7,930,957.

(51) Int. Cl.
*B23B 3/00* (2006.01)
*G06F 19/00* (2011.01)

(52) U.S. Cl. .......................... 82/117; 700/159

(58) Field of Classification Search .............. 82/1.11, 82/117, 118; 483/11; 451/9; 700/159, 160; 702/179
See application file for complete search history.

(56) References Cited

U.S. PATENT DOCUMENTS

| | | | | |
|---|---|---|---|---|
| 3,646,839 | A * | 3/1972 | Shillam | 82/173 |
| 4,212,135 | A * | 7/1980 | Mirsch et al. | 451/5 |
| 5,666,202 | A | 9/1997 | Kyrazis | |
| 6,004,017 | A | 12/1999 | Madhavan | |
| 6,352,496 | B1 * | 3/2002 | Oldani | 483/55 |
| 6,519,860 | B1 * | 2/2003 | Bieg et al. | 33/503 |
| 6,804,575 | B2 | 10/2004 | Sagawa et al. | |
| 6,845,340 | B2 * | 1/2005 | Edie et al. | 702/179 |
| 6,961,637 | B2 * | 11/2005 | Scherer | 700/173 |
| 7,056,072 | B2 * | 6/2006 | Mizutani et al. | 409/131 |
| 7,096,087 | B2 * | 8/2006 | Sagawa et al. | 700/160 |
| 7,148,647 | B2 * | 12/2006 | Aoyama et al. | 318/569 |
| 2003/0023341 | A1 | 1/2003 | Sagawa et al. | |
| 2008/0105094 | A1 * | 5/2008 | McMurtry et al. | 82/118 |

OTHER PUBLICATIONS

In the US Patent and Trademark Office U.S. Appl. No. 11/450,444, Non-Final Office Action dated Apr. 16, 2010, 4 pages; and corresponding response dated Oct. 15, 2010, 8 pages.
Bartow, Matthew J., et al.; "Fiber Bragg Grating Sensors for Dynamic Machining Applications"; *Proceedings of the SPIE*, 2003; 5278:21-31.
International Search Report in corresponding application dated Dec. 4, 2007, 11 pages.

* cited by examiner

*Primary Examiner* — Will Fridie, Jr.
(74) *Attorney, Agent, or Firm* — Patton Boggs LLP

(57) ABSTRACT

A closed-loop feedback system and method for performing a machining operation. A tool's operational properties are measured in real-time. The operating parameters of the machining process are adjusted in real-time based on the measured properties.

8 Claims, 4 Drawing Sheets

CLOSED-LOOP CNC MACHINE SYSTEM AND METHOD

CROSS-REFERENCE TO RELATED APPLICATIONS

This Application is a Continuation of U.S. patent application Ser. No. 11/450,444 filed on Jun. 12, 2006.

BACKGROUND OF THE INVENTION

CNC or Computer Numerical Control has been used in machining operations for decades to automate machining operations that previously were performed by a manual operator. Such operations include moving a tool or workpiece in relation to each other in three dimensional space in order to perform an operation on the workpiece. CNC programming consists of generating computer commands that are passed to a machine tool that has a CNC control. The commands instruct the control on what tool paths the machine tool should take and sets various machining conditions such as the feed, or speed the tool cuts into the workpiece, and spindle speed, or the speed with which the tool rotates when cutting the workpiece.

A CNC machine is a computer-controlled machine, which employs a simple software language to control a mechanically complex machine using open- and closed-loop control mechanisms. CNC machining is divided into two main types of machining processes: milling and turning. Milling is performed by a milling machine, and involves positioning a non-rotating work-piece underneath a spindle, which removes material using a sharp, rotating cutter, called an end mill. Turning is performed by a lathe, and involves spinning a round work-piece in a machine spindle and cutting the work-piece using a non-rotating tool bit. A picture of a typical CNC Lathe is shown in FIG. 1.

The primary goals of any CNC turning operation are quality and speed. Five main factors influence the quality and speed of a turning operation: 1) Rigidity of cutting tool, 2) Sharpness of cutting tool, 3) Hardness of work-piece, 4) Speed of work-piece rotation ("spindle speed"), and 5) Amount of material removed ("feed rate").

Turning operations are divided into two basic types: inside turning (also called "boring") and outside turning. Outside turning can be performed using a very rigid cutter, because the size of the tool is not restricted by the diameter of the workpiece. A picture of outside turning is shown in FIG. 2. Inside turning, on the other hand, restricts tool geometry, and therefore stiffness, because the cutter must be able to fit inside the work-piece. A picture of inside turning is shown in FIG. 3.

Inside turning can be challenging to optimize, because the five main factors listed above are inter-related and achieving a productive balance often involves trial and error. A machinist typically approaches an inside turning operation with 3 out of the 5 factors defined in advance. Sharpness of cutting tool, rigidity of cutting tool, and hardness of work-piece material are typically defined during the initial setup of a turning operation. The machinist optimizes the remaining 2 factors, speed of cut and feed rate of cut, by changing software parameters in the CNC Program. This optimization is often the result of trial and error: the machinist loads a work-piece into the machine and commands the machine to execute the CNC program. The machinist then removes the work-piece and examines its quality. If the quality is unsatisfactory, the machinist will make one or more changes to the CNC program, and repeat the process until a quality part is produced.

CNC machines are a combination of mechanical hardware, computer control systems, and computer software. CNC machines are mechanically complex, and the variety and robustness of product offerings represent some of the best American mechanical engineering. Evolution of mechanical design has continued since the industrial revolution. For the most part, the control systems and software engineering are relatively simplistic by comparison. While software engineering and computers have grown exponentially in consumer and scientific markets, industrial controls for manufacturing have fallen behind and still employ the same basic algorithms developed in the 1950's and 60's. Accordingly there remains a need drive the state-of-the-art if the United States is to remain competitive in the world market for industrial manufacturing automation. There further remains a need for the evolution of closed-loop control systems for manufacturing automation for improved productivity. The present invention fills this need by providing a method and system that provides real-time control of the machining operation by measuring properties of the tool in real-time and adjusting the machining parameters in real-time.

SUMMARY OF THE INVENTION

One embodiment of the present invention is a method for performing a machining operation on a workpiece. The method includes providing a tool for physically removing material from the workpiece. An algorithm is provided setting the initial operating parameters for the machining operation. At least one physical property of the tool is measured in real-time. The algorithm is adjusted in real-time based on the at least one measured physical property.

Another embodiment of the present invention is a closed-loop feed back CNC controlled inside turning process performed on a workpiece. The method includes providing a boring bar. An initial CNC code is provided that sets the initial spindle speed and feed rate for the turning process. At least one of the force on the boring bar, the deflection of the boring bar, and the vibration of the boring bar is measured in real-time during the inside turning process. The CNC code is adjusted in real-time to set a new spindle speed and feed rate based on the real-time measurement.

Another embodiment of the present invention is a closed-loop feedback control machining system. The system includes a machine, a tool, at least one sensor, at least one signal analyzer, and at least one controller. The machine includes a workpiece holder, a tool holder, a spindle drive system and a feed drive system. The spindle drive system provides relative rotation between a workpiece and the tool. The feed drive system provides relative translational movement between a workpiece and the tool. The at least one sensor is operatively associated with the tool. The at least one signal converter is operatively associated with the at least one sensor. The at least one signal analyzer is operatively associated with the at least one signal converter. The at least one controller is operatively associated with the at least one signal analyzer and operatively associated with the spindle drive system and the feed drive system. The at least one sensor receives a signal from the tool and transmits the signal to the at least one signal converter. The at least one signal converter converts the received signal to a set of digital parameters and transmits the digital parameters to the at least one signal analyzer. The at least one signal analyzer determines in real-time at least one of the force on the tool, the deflection of the tool, and the vibration of the tool. The at least one controller adjusts the power exerted by at least one of the spindle drive system and the feed drive system in real-time based on the real-time determinations.

DETAILED DESCRIPTION OF THE INVENTION

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implicated in other compositions and methods, and that any such variation would be within such modifications that do not part from the scope of the present invention. Before explaining the disclosed embodiments of the present invention in detail, it is to be understood that the invention is not limited in its application to the details of any particular embodiment shown, since of course the invention is capable of other embodiments. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein. Further, although certain embodiments are shown in the figures, the present invention is certainly not intended to be limited to these portrayed embodiments.

Figure 1:
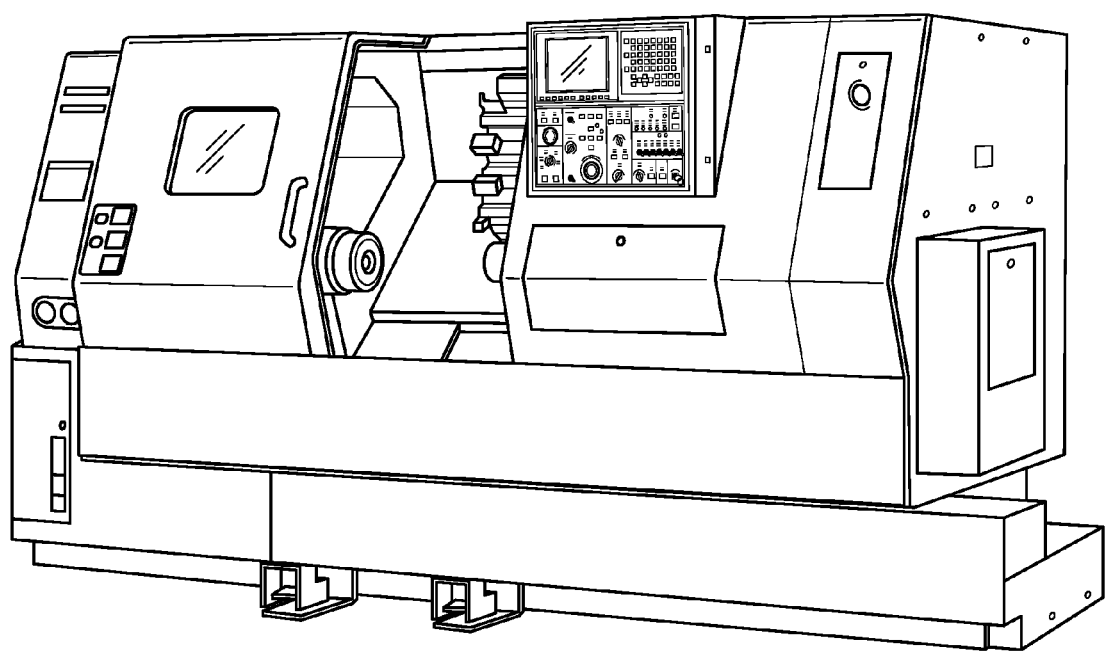
FIG. 1 shows a picture of a typical CNC lathe.
Figure 2:
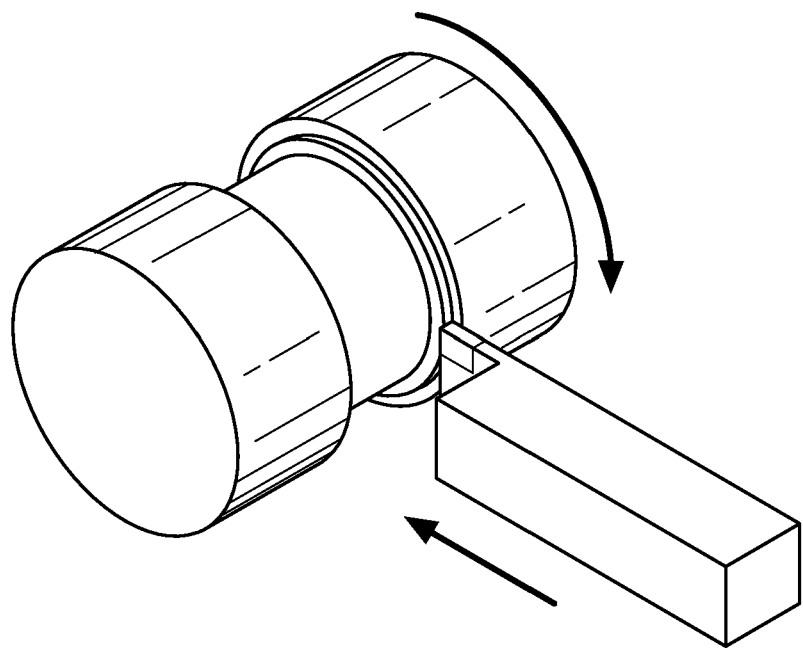
FIG. 2 shows a picture of a typical outside turning process.
Figure 3:
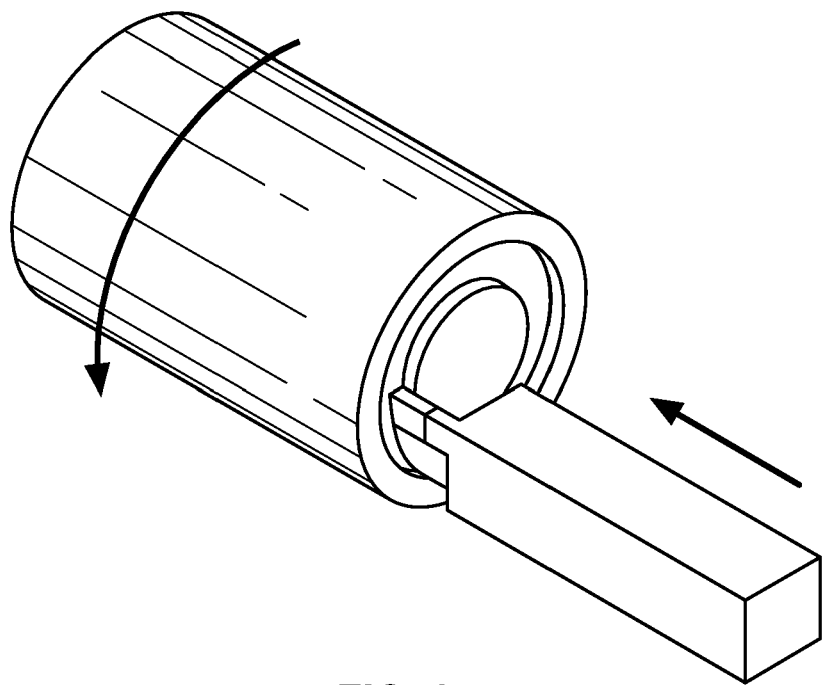
FIG. 3 shows a picture of a typical inside turning process.
Figure 4:
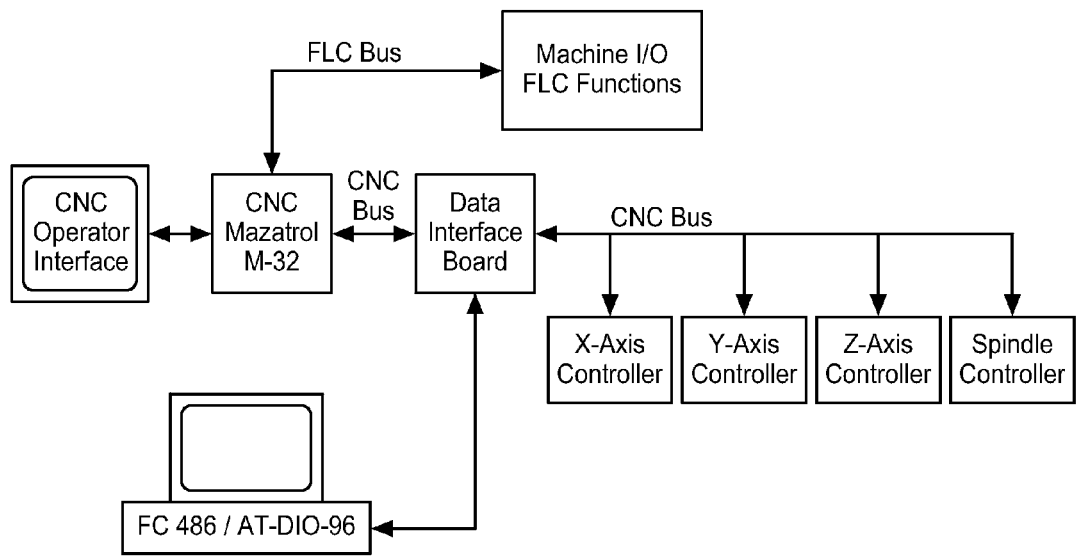
FIG. 4 shows a block diagram of a typical CNC machine.

CNC machines utilize a combination of open-loop and closed-loop control systems. A closed-loop control system consists of an output coupled to an input via a control algorithm, and, it provides the best accuracy since output is compared to input and appropriate compensation is added to make the two match. A block diagram for a typical CNC machine is shown in FIG. 4. Physical measurements of dimensions such as tool length and part diameter are examples of closed-loop control in typical machine tools. These machines are capable of producing a part, measuring the physical dimensions of the part, and making parameter adjustments to correct inaccuracies. However, typically a human operator is responsible for making adjustments to CNC machine code to account for poor surface finish and/or accelerated tool wear. The human operator is likely to make a single optimization, during the initial setup of a part routine. This optimization will attempt to account for tool wear throughout the production run, however it will be a one-time compromise with minimal real-time compensation for change. Typical CNC equipment has no provision for autonomously correcting qualitative parameters, such as poor surface finish caused by tool vibration (or "chatter"). In order to make strides in closed-loop control systems, the CNC machine needs additional process inputs.

As used herein, "machining operation" refers to any process where a machine holds a tool and the tool contacts a workpiece. Typical machining operations include milling and turning. Typically, milling machines are used for milling and lathes are used for turning. Each machine typically also includes a tool holder. As used herein, "tool" refers to the actual device that contacts a workpiece and not the entire machine itself. Typical tools include end mills used in milling machines and boring bars used in lathes. As used herein, "measuring at least one physical property" refers to both measuring the absolute value of the physical property and measuring the rate of change of the property with respect to time.

One embodiment of the present invention is a closed-loop control method for performing a machining operation on a workpiece with a tool. The method comprises providing a tool for performing a machining operation. The tool and the workpiece are provided with initial operational parameters. Physical properties of the tool are measured in real-time. Based on these measurements, the operational parameters are adjusted to optimize the machining operation.

Figure 5:
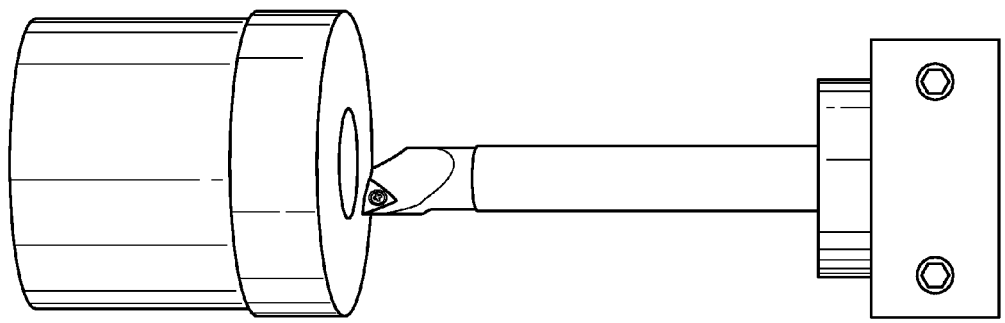
FIG. 5 shows a picture of a typical boring bar performing an inside turning process.

Preferably, the machining operation is an inside turning process. Preferably the turning process is performed by a lathe and the tool is a boring bar. In this embodiment, the tool is stationary and the workpiece is rotated. The workpiece is also moved towards the tool in a direction that is parallel to the axis of rotation of the tool. The workpiece is turned at a speed known as the spindle speed. The workpiece is provided with an initial spindle speed. The workpiece is also moved translationally with respect to the tool at a speed known as the feed rate. The workpiece is provided with an initial feed rate. FIG. 5 shows a picture of a boring bar performing an inside turning process.

The measured tool properties may include any properties that can be used to determine the quality of the machining operation in real-time. Preferably, the measured properties include the deflection of the tool, the forces exerted on the tool and the vibrations of the tool. The deflection, forces and vibrations of the tool while performing the machining operation on the workpiece may be determined by the use of at least one sensor. Any sensor may be used that is rugged enough to withstand the harshness of the machining environment and provide accurate measurement of the deflection, forces and vibrations. Exemplary sensors include magnetic sensors, analog strain sensors and fiber optic sensors. Analog strain sensors will provide measurement of the actual deflection, force or vibration while magnetic and fiber optic sensors will provide a measurement of the change of the property with respect to time. The actual value of the property is not a necessity because the measurement is taken to predict a desirable change in the operating parameters of machining process to improve part quality. The sensor may be located in the tool itself, on the tool holder, or somewhere inside the machine.

In the embodiment using fiber optic sensors, preferably at least one sensor is embedded in the tool. The sensor may be embedded in any part of tool. Preferably, the sensor is embedded in the far most end from the tool holder such that the greatest deflection, force and vibration can be measured. In this embodiment, a light may be shined on the sensor in the tool. The embedded sensor may return the light back to an electronic control interface which converts the optical signal into digital parameters that can be read by a signal analyzer. The interface may then send the converted signal to a signal analyzer. The signal analyzer may then analyze the signal and determine the deflection, forces and vibrations on the tool. This determination is based on the change in these parameters causing a change in the optical signal received by the external sensor. The signal analyzer may then feed this information to microprocessor instituting an Active Tool Control Electronics Feedback Loop. The Feedback Loop may then determine if the spindle speed or feed rate should be adjusted based on the determined tool properties. The Feedback Loop may then create new algorithms for the spindle speed and feed rate. The Feedback Loop may then provide these new algorithms to a machine controller, preferably a CNC machine controller. The controller may then adjust the spindle speed and/or feed rate of the workpiece. This process may be performed continuously during the entire duration of the machining operation.

Figure 6:
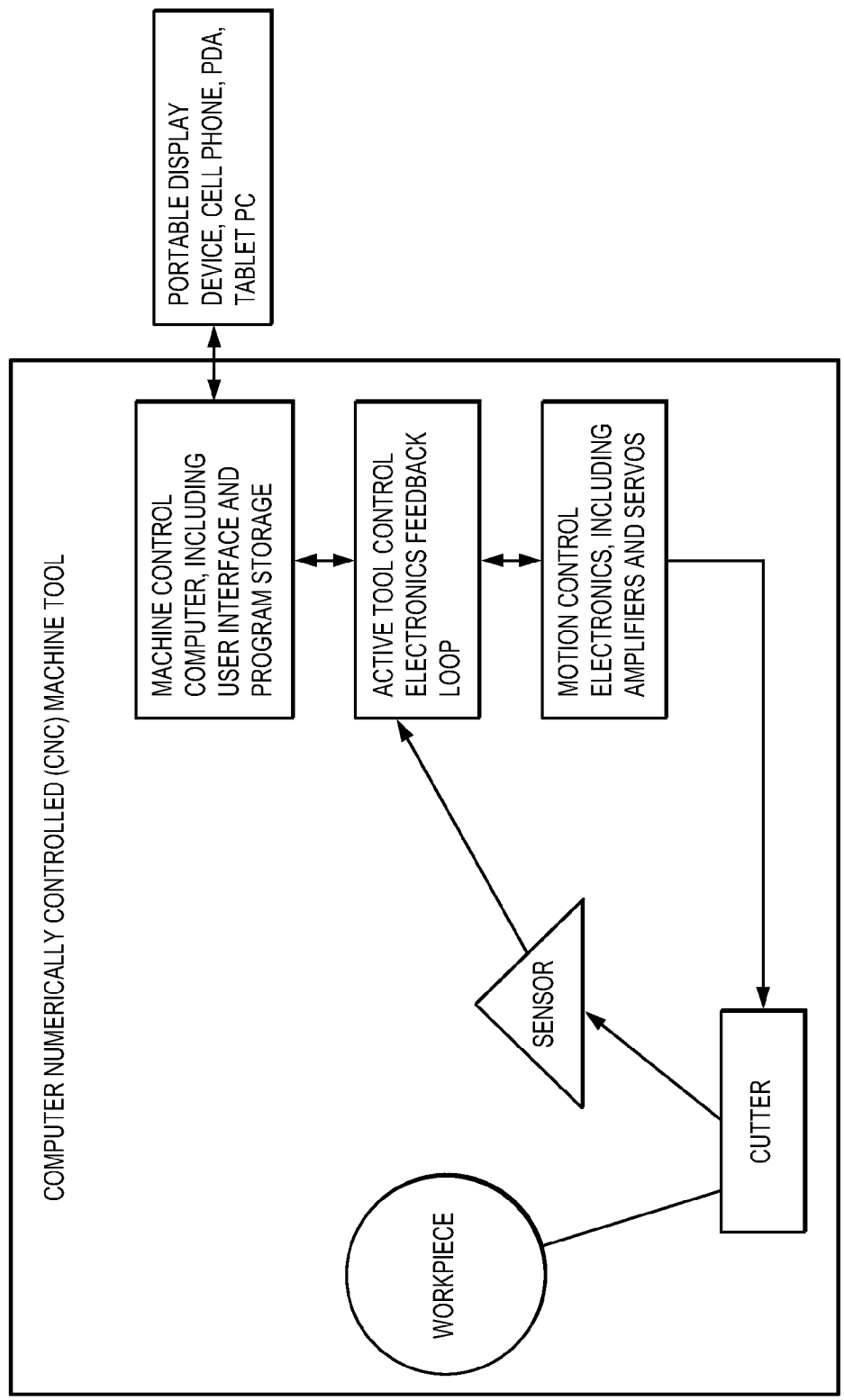
FIG. 6 shows a block diagram of a closed-loop feedback CNC controlled machining operation of one embodiment of the present invention.

FIG. 6 shows a basic block diagram of the method of the present invention used with a CNC machine tool. A sensor senses physical properties of a tool or cutter that performs an operation on a workpiece. The sensor communicates with an Active Tool Control Electronics Feedback Loop. The Feedback Loop analyzes the sensed physical properties and determines new operational parameters for the process based on the analysis. The Feedback Loop communicates with motion control electronics such as amplifiers and servos. The amplifiers and servos change the operational parameters of the machining process between the cutter and workpiece. The Feedback Loop also communicates with a machine control computer. The machine control computer includes a user interface and program storage. The user interface displays the measured physical properties of the cutter and the changes made in the operational parameters. The program storage stores this information for future reference. The machine control computer also communicates with a portable display device such as a cellular phone, PDA, or tablet PC. This provides remote communication of the information displayed on the user interface to a remote machine operator. All of the steps shown in FIG. 6 are performed in real-time during the machining operation.

In the embodiment using a fiber optic sensor, a light source throws light to a type of light manager that can both sense and transmit light signals. The light manager then throws a light signal to a fiber optic sensor embedded inside the tool being used in the machining operation. The sensor then throws a light signal back to the light manager. This signal will vary depending on the forces on the tool, the deflection on the tool and the vibration of the tool. The light manager then throws the light signal to a second light manager. The second light manager receives the signal and throws an appropriate signal to both a tunable filter and a high speed detector. The filter filters the light and sends an appropriate signal to the high speed detector. The detector then detects the signal and converts it to a signal that can be read by a signal analyzer. The detector then sends the converted signal to the signal analyzer. The signal analyzer may then analyze the signal and determine the values of the physical properties of the tool. The signal analyzer may then provide these values to an Active Tool Control Electronics Feedback Loop and the Feedback Loop uses the values as described above. This process may be performed continuously during the entire duration of the machining operation. The above description is not meant to be a comprehensive description of the operation of a fiber optic sensor. Those of ordinary skill in the art understand the operation of such a sensor and therefore this detailed description is omitted. Bartow et al. in "Fiber Bragg grating sensors for dynamic machining applications" Proceedings of the SPIE, Volume 5278, pp. 21-31 (2003), which is hereby incorporated by reference in its entirety, describe use of a fiber optic sensor embedded in a tool to measure vibrations in the tool.

In the embodiment using magnetic sensors, a sensing element may not need to be embedded in the tool. In this embodiment, a magnetic field may be generated in the vicinity of the tool while the tool is in operation. The tool will then create its own magnetic field. The tool-created magnetic field will vary with the forces on the tool, the deflection of the tool and the vibration of the tool. A sensor may then receive the tool-created magnetic field and send it to a signal converter that may convert the signal to a signal that can be read by the signal analyzer. The signal analyzer could determine the deflection, forces and vibration of the tool based on the change in the signal received. The process would then continue as in the embodiment using the fiber optic sensor.

Of course any type of sensor or sensing devices can be used that has ruggedness to withstand harsh industrial environments and delivers the required accuracy in terms of vibration and deflection measurements. Other possible sensors include analog electronic strain gauges. However, fiber optic sensors are preferred because optical measurement has better noise immunity and better frequency response than traditional analog electronic strain gauges.

In a preferred embodiment, at least one of the signal transfers occurs wirelessly. In a more preferred embodiment, at least the signal from the embedded sensor to the signal converter and the signal from the signal converter to the signal analyzer are communicated wirelessly. This would allow machines to be retrofitted with closed-loop control methodology of the present invention in a simple and inexpensive manner.

The measured parameters can also be used to determine that a tool is worn and should be replaced. For example, quality and speed of the machining operation depend on tool properties including the tool's rigidity and sharpness. The less sharp the tool is the slower the machine operation will need to be performed to achieve the same quality. Thus, as the tool wears, the Active Tool Control Electronics Feedback Loop would determine that the spindle speed and/or the feed rate should be decreased. In one embodiment of the present invention, if the adjusted spindle speed or feed rate falls below a certain value a machine operator could be notified that the tool should be replaced. The controller could also cause the machine to shut off if the speed or feed rate falls below a certain value.

The measurements of the tool properties, the adjustments made to the machining operation parameters, and tool wear alerts can be communicated to a machine operator. Preferably, communication is performed wirelessly to a portable display device such as cellular phone, a personal digital assistant (PDA) or a tablet or laptop PC. Such methods of wireless communication are well known in the art and detailed description is omitted here. The machine operator may choose to override the controller's adjustments.

Another embodiment of the present invention is a system for performing a machining operation. The system includes a machine, a tool, at least one sensor, an electronic control hardware interface; machine control software and a controller.

The machine may be any type of machine which uses a tool to perform an operation on a workpiece. Exemplary machines include milling machines and lathes. Preferably, the machine is a lathe. The tool may include any tool that is commonly used in machining. Preferably, the tool is a boring bar used for inside turning or boring. The at least one sensor may be any type of sensor capable of withstanding harsh operating conditions and accurately measuring tool parameters such vibration, deflection and force, as described above. Exemplary sensors include analog electronic strain gauges, fiber optic sensors and magnetic sensors. Preferably, the at least one sensor is a fiber optic sensor. The hardware interface is not limited to any particular design but must be capable of incorporating the input measurement from the sensor into the controller. The machine control software must be capable of incorporating the input measurement into the algorithm used by the controller. Preferably, the controller is a CNC device.

In one embodiment, the system may be retrofitted onto a machine with an existing CNC controller. In this embodiment, the system may include a rugged optical sensor embedded within a tool such as a boring bar, a miniature, rugged, control electronics suite, integrated into the existing CNC control, and a software suite which incorporates feedback from optical sensor into the CNC.

The present invention will improve the performance of Computer-Numerically-Controlled (CNC) equipment by incorporating a closed-loop control system to vary cut parameters such as speeds and feeds based on input from a sensor such as a fiber-optic sensor which measures tool forces, deflections and vibrations. The present invention will permit CNC equipment to perform at a higher level of productivity, managing an increased number of process parameters under autonomous machine control. The increased autonomy will yield higher quality product, and will free the machine operator to focus on tasks that are better suited to human technicians, such as overall system optimizations, and other qualitative improvements. The present invention by providing closed-loop feedback to a manufacturing process at the equipment level will ensure production of a higher quality part automatically instead of relying on a machine operator's adjustment of the process parameters after examining the quality of a finished part. Thus, the present invention provides real-time quality control for a manufacturing process. The importance of providing real-time control for the machining operation increases with depth of the process. For example, in a boring process, the deeper the bore into the workpiece, the greater amount of chatter that will be expected during the operation. Thus, without providing closed-loop feedback control for such a process, the part quality would be expected to be low.

Although the present disclosure has focused mainly on turning machine operations, the invention is not limited to any particular machining operation. The present invention could be applied to optimize milling operations and other machine operations known to those skilled in the art. Also although the description has focused on the measurement of the deflection and vibration of the tool, any measurement that provides information as to the performance of the tool in the cutting operation can be used. Although the present disclosure has focused on closed-loop control for CNC machines, the present invention is not so limited. The present invention of measuring properties of a tool in real-time and adjusting the parameters of a machining operation in real-time based on the measurement to provide higher quality parts can be applied to any machining process. Although certain elements of a system have been described as performing certain steps, the invention is not so limited. A particular element could perform several steps or the different steps could be performed by several elements.

Although certain embodiments of the invention have been described, the invention is not meant to be limited in any way to just these embodiments. The invention is only meant to be limited by the appended claims.

What is claimed as new and desired to be protected by Letters Patent of the United States is:

1. A closed-loop feedback control machining system, the system comprising: a machine comprising: a workpiece holder; a tool holder; a spindle drive system for providing relative rotation between a workpiece and a tool; and a feed drive system for providing relative translational movement between a workpiece and a tool; a tool; at least one sensor operatively associated with the tool; at least one signal converter operatively associated with the at least one sensor; at least one signal analyzer operatively associated with the at least one signal converter; and at least one controller operatively associated with the at least one signal analyzer and operatively associated with the spindle drive system and the feed drive system, wherein the at least one sensor receives a signal from the tool and transmits the signal to the at least one signal converter, wherein the at least one signal converter converts the received signal to a set of digital parameters and transmits the digital parameters to the at least one signal analyzer, wherein the at least one signal analyzer determines in real-time at least one of the elements selected from the group consisting of: the force on the tool, the deflection of the tool, and the vibration of the tool, and wherein the at least one controller adjusts the power exerted by at least one of the spindle drive system and the feed drive system in real-time based on the real-time determinations.

2. The closed-loop feedback control machining system of claim 1, wherein the machine is a lathe.

3. The closed-loop feedback control machining system of claim 1, wherein the tool is a boring bar.

4. The closed-loop feedback control machining system of claim 1, wherein the at least one sensor is selected from the group consisting of: fiber optic sensors, magnetic sensors, and analog electronic strain gauges.

5. The closed-loop feedback control machining system of claim 2, wherein the signal received from the tool is an optical signal.

6. The closed-loop feedback control machining system of claim 1, wherein the at least one controller is a CNC controller.

7. The closed-loop feedback control machining system of claim 1, further comprising a portable display device operatively associated with the at least one controller such that the portable display device can inform a user of the adjustments made by the controller.

8. The closed-loop feedback control machining system of claim 7, wherein the portable display device is selected from the group consisting of a cellular phone, a PDA, and a tablet PC.

* * * * *